US010986282B2

United States Patent
Sugawara

(10) Patent No.: US 10,986,282 B2
(45) Date of Patent: Apr. 20, 2021

(54) IMAGE PICKUP APPARATUS THAT PERFORMS FLASH SHOOTING SUITABLE FOR BOTH MAIN SUBJECT AND BACKGROUND, CONTROL METHOD THEREFOR, AND LIGHT EMISSION CONTROL APPARATUS

(71) Applicant: CANON KABUSHIKI KAISHA, Tokyo (JP)

(72) Inventor: Atsushi Sugawara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 16/048,451

(22) Filed: Jul. 30, 2018

(65) Prior Publication Data

US 2019/0045101 A1 Feb. 7, 2019

(30) Foreign Application Priority Data

Aug. 1, 2017 (JP) .............................. JP2017-149199

(51) Int. Cl.
*H04N 5/235* (2006.01)
*H04N 5/243* (2006.01)
*H04N 5/225* (2006.01)
*H04N 5/232* (2006.01)

(52) U.S. Cl.
CPC ......... *H04N 5/2354* (2013.01); *H04N 5/2256* (2013.01); *H04N 5/2351* (2013.01); *H04N 5/243* (2013.01); *H04N 5/23219* (2013.01)

(58) Field of Classification Search
CPC .. H04N 5/2354; H04N 5/2256; H04N 5/2351; H04N 5/243; H04N 5/23219
See application file for complete search history.

(56) References Cited

U.S. PATENT DOCUMENTS

| 2011/0150451 A1* | 6/2011 | Kubota | G03B 15/05 396/159 |
| 2017/0134625 A1* | 5/2017 | Salazar | H04N 5/2256 |
| 2017/0374335 A1* | 12/2017 | Hsu | G03B 15/03 |

FOREIGN PATENT DOCUMENTS

| CN | 105791708 A | 7/2016 |
| JP | 2003215675 A | 7/2003 |
| WO | 2017082991 A1 | 5/2017 |

OTHER PUBLICATIONS

Office Action issued in Chinese Appln. No. 201810862465.6 dated Oct. 16, 2020. English translation provided.

* cited by examiner

*Primary Examiner* — Nicholas G Giles
(74) *Attorney, Agent, or Firm* — Rossi, Kimms & McDowell LLP

(57) ABSTRACT

An image pickup apparatus which enables a flash shooting in which a main subject such as a person is easily and beautifully picked up and a background with a natural hue is also picked up. A light emitting device is able to vary a color temperature of an illumination light. In a case where a main subject is detected at a time of shooting, shooting with causing a light emitting device to emit a light is performed with a color temperature which is set lower by a predetermined amount determined in advance from the obtained color temperature of the ambient light depending on a obtained color temperature of an ambient light, and a white balance adjustment is performed on the shot image with a color temperature obtained from an ambient light.

13 Claims, 3 Drawing Sheets

IMAGE PICKUP APPARATUS THAT PERFORMS FLASH SHOOTING SUITABLE FOR BOTH MAIN SUBJECT AND BACKGROUND, CONTROL METHOD THEREFOR, AND LIGHT EMISSION CONTROL APPARATUS

BACKGROUND OF THE INVENTION

Field of the Invention

The present invention relates to an image pickup apparatus and a control method therefor, and in particular to a flash emission control technique in an image pickup apparatus such as a digital camera.

Description of the Related Art

When a flash shooting is performed by an image pickup apparatus such as a digital camera, knowledge of a photographer or an additional accessory is necessary so that a taken skin color of a person looks natural, causing difficulty for a general camera user. Specifically, the camera user needs to adjust a flash color temperature of a flash light by a color filter or to configure white balance setting for a shot image so as to follow a shooting intention.

On the other hand, an LED (light-emitting diode) has started to be employed in addition to a xenon tube as a light source of the flash apparatus. For example, if a flash unit is configured by a combination of a plurality of LEDs having different color temperatures, the flash apparatus which can easily vary the flash color temperature without using the color filter and the like by controlling brightness of the LEDs separately for respective color temperatures.

As a technique employing a flash apparatus which can vary a color temperature, it has been proposed one having a storage unit which stores color temperatures suitable for shooting specific subjects (Japanese Laid-Open Patent Publication (Kokai) No. 2003-215675). In this proposal, when a user sets a subject to be shot (for example, a person, a flower, or the like), a color temperature optimum for shooting the set subject is read out from the storage unit. By performing the flash shooting with the readout color temperature, anyone is able to easily obtain an image of a beautiful color tone.

In Japanese Laid-Open Patent Publication (Kokai) No. 2003-215675, however, since the flash apparatus emits a light with a color temperature adjusted to a main subject set by the user at a time of shooting, a problem that a hue of a background is unnatural although the main subject looks beautiful arises if color temperatures between the main subject and the background are significantly different.

SUMMARY OF THE INVENTION

The present invention provides an image pickup apparatus which enables a flash shooting in which a main subject such as a person is easily and beautifully picked up and a background with a natural hue is also picked up and a control method therefor. A light emission control apparatus can also be provided.

Accordingly, the present invention provides an image pickup apparatus which is capable of performing shooting using a light emitting device that is able to vary a color temperature of an illumination light, the image pickup apparatus comprising at least one processor, the at least one processor functioning in accordance with a program stored in a memory as: an obtainment unit configured to obtain a color temperature of an ambient light; a detection unit configured to detect a main subject; an adjustment unit configured to perform a white balance adjustment on a shot image; and a control unit configured to, in a case where the detection unit detects the main subject at a time of shooting, perform the shooting with causing the light emitting device to emit a light with a color temperature which is set lower by a predetermined amount determined in advance from the obtained color temperature depending on the color temperature obtained by the obtainment unit, and cause the adjustment unit to perform the white balance adjustment on the shot image with the obtained color temperature.

According to the present invention, a flash shooting in which a main subject such as a person is easily and beautifully picked up and a background with a natural hue is also picked up is enabled.

Further features of the present invention will become apparent from the following description of exemplary embodiments (with reference to the attached drawings).

DESCRIPTION OF THE EMBODIMENTS

Hereinafter, an embodiment of the present invention will now be described with reference to the accompanying drawings.

Figure 1:
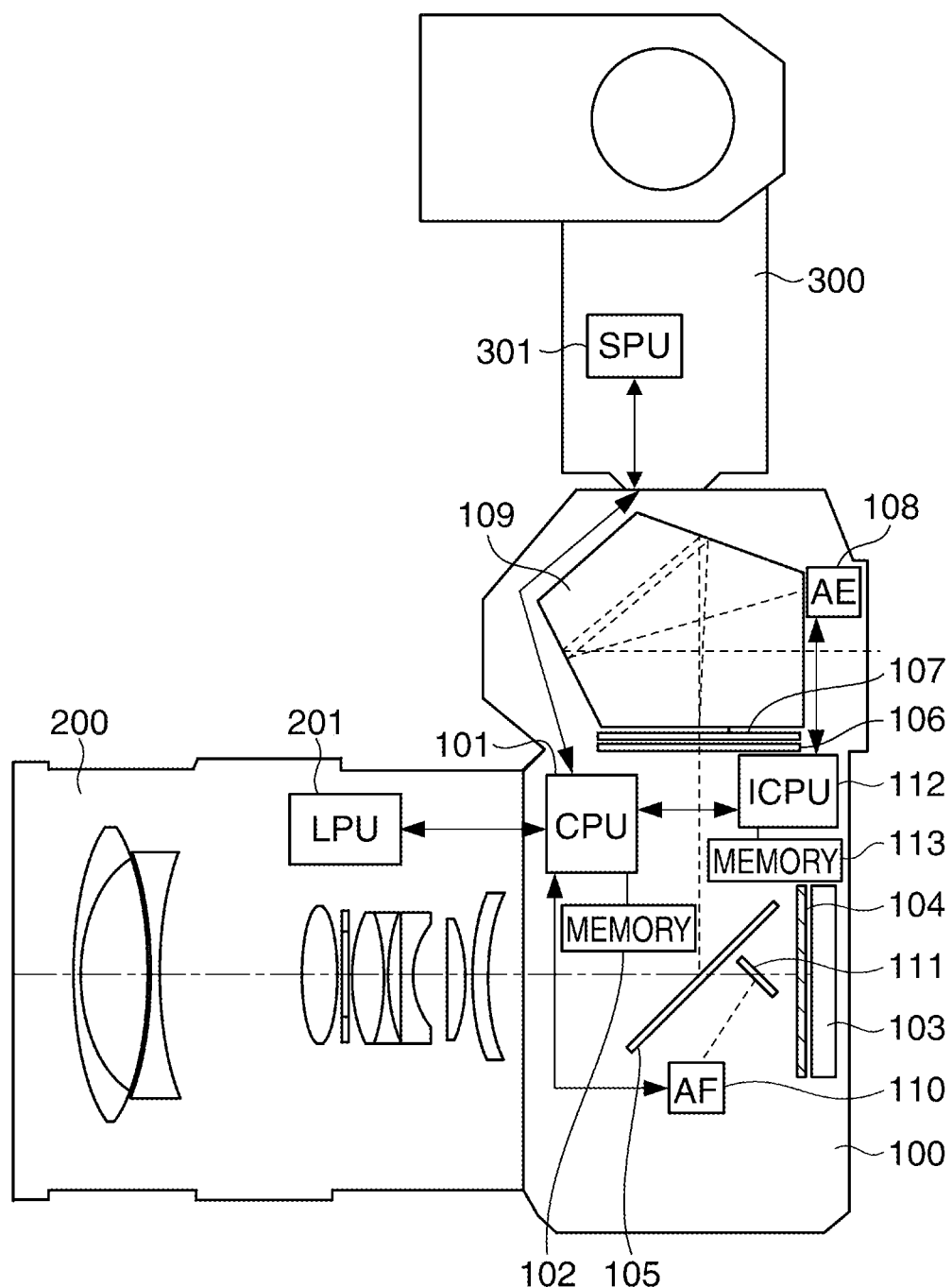
FIG. 1 is a cross sectional view schematically showing a digital single-reflex camera which is an example of an embodiment of an image pickup apparatus according to the present invention.

FIG. 1 is a cross sectional view schematically showing a digital single-reflex camera which is an example of the embodiment of an image pickup apparatus according to the present invention.

In the digital single-reflex camera of the present embodiment (hereinafter, referred to as a camera), a lens unit 200 is mounted detachably to a front side of a camera main body 100, and a flash unit 300 is mounted detachably to an upper portion of the camera main body 100.

The camera main body 100 comprises a CPU 101 which controls overall operation of the entire camera, and a memory 102 comprised of a RAM, a ROM, and the like is connected to the CPU 101. The CPU 101 issues instructions regarding a flash color temperature and a light emission amount, for example, to be described later, to a flash unit 300. An image pickup device 103 is comprised a CCD sensor, a CMOS sensor, or the like including an infrared filter, a low pass filter, and the like, and a subject image having passed through a shooting optical system of the lens unit 200 is formed on the image pickup device 103.

A shutter 104 shields the image pickup device 103 from light in a non-shooting state and opens at a time of shooting to guide a subject light beam to the image pickup device 103. In the present embodiment, the shutter 104 is configured as a mechanical focal plane shutter which performs an exposure by forming a slit with a front curtain and a rear curtain and running the slit. In the flash shooting, the front curtain and the rear curtain run in timing with a light-emitting timing of a light emitting portion of the flash unit 300.

In the non-shooting state a half mirror 105 reflects a part of the subject image incident via the lens unit 200 and forms an image on the focusing plate 106. A display device 107 is comprised of a PN liquid crystal and the like, and the user is able to check a variety of pieces of shooting information displayed on the display device 107. A photometric sensor 108 performs a photometry by using the image pickup device such as the CCD sensor, the CMOS sensor. In the present embodiment, the photometric sensor 108 is also used for adjusting the flash light, of which detailed description is to be described later.

A pentagonal prism 109 guides the subject image formed on the focusing plate 106 to the photometric sensor 108 and an optical viewfinder. The photometric sensor 108 receives the subject image formed on the focusing plate 106 via the pentagonal prism 109 from a location oblique to the subject image. A sub mirror 111 guides a subject light which has incident on and has passed through the half mirror 105 via the shooting optical system of the lens unit 200 to an AF sensor of a focus detection circuit 110, which in turn performs a distance measurement.

An ICPI 112 is a CPU which performs drive control of the photometric sensor 108 and the image pickup device 103, image processing, and computation. The ICPU 112 also performs photometric computation, a process to detect a face of a person (main subject) from an image obtained by the photometric sensor 108, and a white balance adjusting process on an image picked up by the image pickup device 103. A memory 113 comprised of a RAM, a ROM, and the like is connected to the ICPU 112.

The lens unit 200 has the shooting optical system comprised of a plurality of lenses, a diaphragm, and the like, a variety of driving devices which drive the lenses and the diaphragm, and an LPU 201. The LPU 201 is a CPU which sends information such as a distance to the subject and the diaphragm to the CPU 101 of the camera main body 100. It should be noted that the lens unit 200 may be configured integrally with the camera main body 100.

The flash unit 300 has the light emitting portion, an SPU 301, and the like. The SPU 301 is a CPU which provides a control on flashing, and sends and receives information of a color temperature and a light emission amount to and from the camera main body 100 by communicating with the CPU 101 of the camera main body 100. In the present embodiment, the flash unit 300 and the camera main body 100 have a group of electrical contacts for connection (not shown), respectively, and they are connected to/disconnected from each other via the group of contacts. It should be noted that the flash unit 300 may be configured integrally with the camera main body 100.

Figure 2:
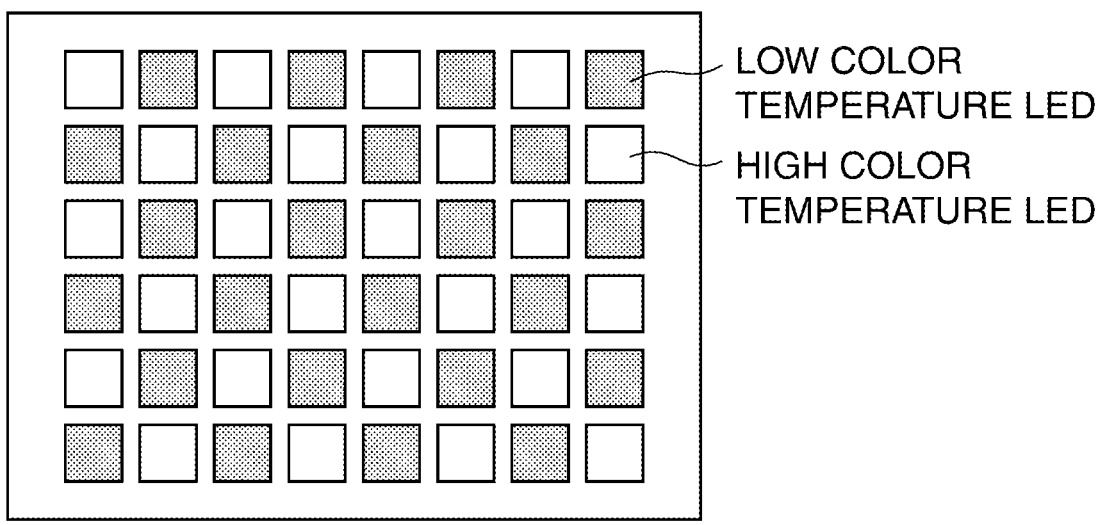
FIG. 2 is a view schematically showing a light emitting portion of a flash unit.

The light emitting portion of the flash unit 300 is comprised of two types of plurality of LEDs having different color temperatures as shown in FIG. 2. Each LED is in a square shape, and high color temperature LEDs and low color temperature LEDs are arranged as a checkered array. The SPU 301 controls a ratio of brightness between the high color temperature LED and the low color temperature LED to obtain light having a color temperature between the high color temperature LED and the low color temperature LED. A desired brightness of the LED is obtained by controlling a driving current or a duty ratio, thereby the flash color temperature is variable. It should be noted that the layout and the ratio of the number of two types of LEDs are not limited to an example shown in FIG. 2. Three types of LEDs consisting of R, G, and B LEDs may be used.

Figure 3:
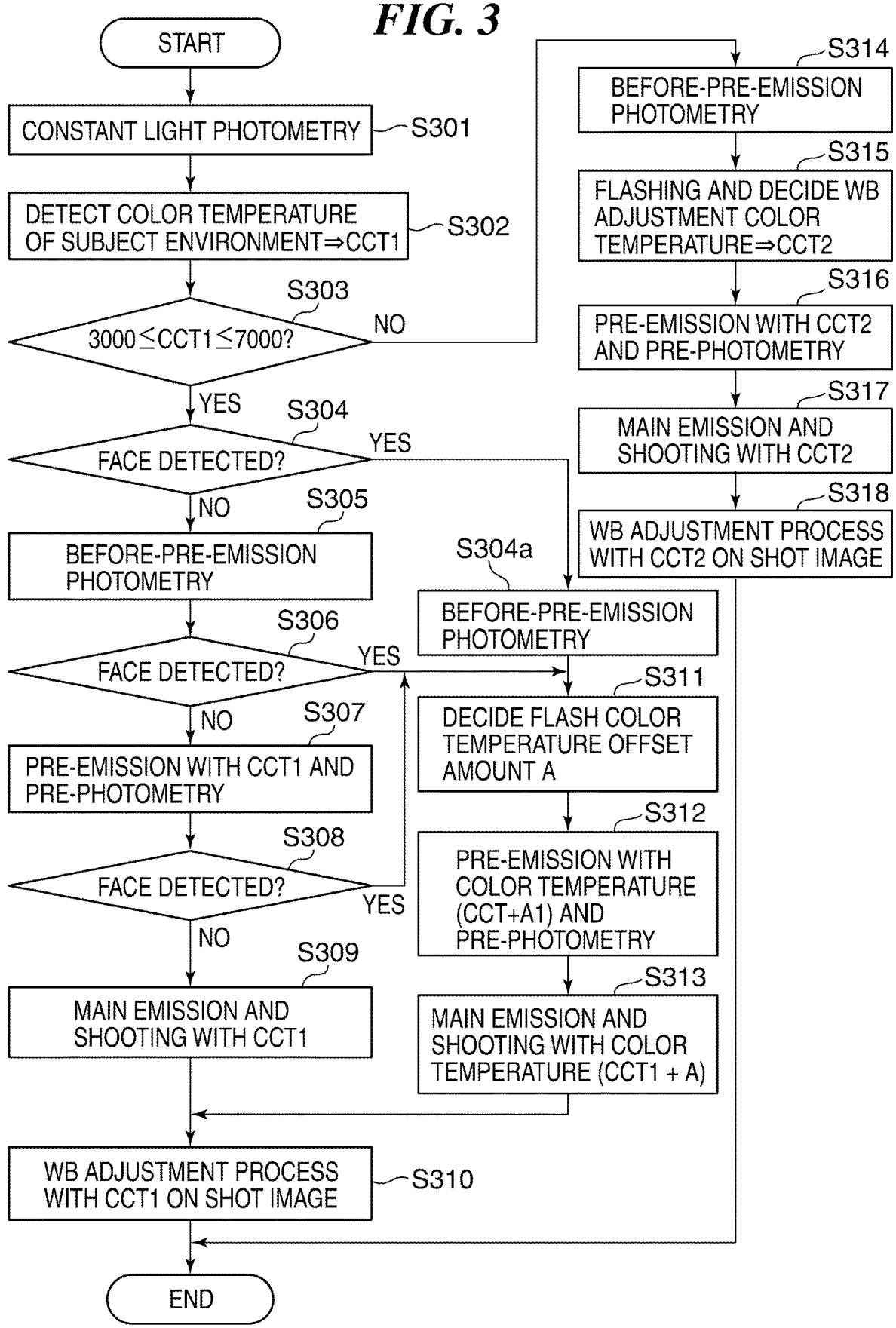
FIG. 3 is a flowchart for use in explaining light-emitting control of the flash unit at a time of flash shooting.

Subsequently, a description will be given of a flash emission control by the flash unit 300 at the time of flash shooting. It should be noted that processes in FIG. 3 is carried out when programs stored in the ROM and the like of the memory 102 of the camera main body 100 are expanded to the RAM, and the CPU 101 communicates with the ICPU 112 and the SPU 301 of the flash unit 300. The flash shooting here is performed with an automatic white balance setting by which the ICPU 112 automatically carries out a white balance adjustment.

In step S301 in FIG. 3, when the user issues an instruction to perform the flash shooting, the CPU 101 performs a constant light photometry and proceeds the process to step S302. The constant light photometry is for measuring a brightness of a shooting environment before flashing. A brightness of a field or presence or absence of a face of a person is detected by picking up an image by the photometric sensor 108 and analyzing the picked-up image by the ICPU 112.

In step S302, the CPU 101 detects a color temperature of a subject environment by using the image picked up by the photometric sensor 108, and proceeds the process to step S303. When the photometric sensor 108 picks up an image and the ICPU 112 performs a color temperature analysis on image data obtained by subjecting the image to the A/D conversion, the detected color temperature is obtained. The detected color temperature is defined as CCT1 here.

In step S303, the CPU 101 determines whether the color temperature CCT1 detected in step S302 falls within a range between 3000 and 7000 [K]. Upon determining that the color temperature CCT1 falls within the range, the CPU 101 proceeds the process to step S304, and upon determining that the color temperature CCT1 does not fall within the range, the CPU 101 proceeds the process to step S314.

In many shooting environments, the color temperature CCT1 is considered to fall within the range between 3000 and 7000 [K], and thus in a case where a result of detecting the color temperature does not fall within the range, a misdetection is likely to occur with some cause. Alternatively, when a quite low color temperature of 2500 [K] is supposed to be detected and then the white balance adjustment is performed, a red color may be missing from an entire screen. To prevent this problem, an automatic white balance linking range is set for the detected color temperature. In the present embodiment, it is assumed that the color temperature CCT1 between 3000 and 7000 [K] corresponds to the automatic white balance linking range.

Processes from steps S303 to S310 is a flash shooting process sequence performed basically in a case where the face of the person is not detected, that is, it is determined as "NO" in steps S304, S306, and S308. A case where it is determined as "YES" in steps S304, S306, and S308 will be described later, and the processes in steps S305, S307, S309, and S310 will be described first.

In the flash shooting of the present embodiment, more natural image can be obtained by performing flashing and shooting with a color temperature same as an ambient light of the subject. A pre-emission (preliminary emission) is performed as a process unique to the flash shooting in order to estimate a light emission amount of shooting (main emission).

In the present embodiment, an output of the photometric sensor 108 with no flash emission (hereinafter, referred to as "before-pre-emission photometry") and an output of the photometric sensor 108 at the time of pre-emission in which the flash emission is performed with a predetermined amount (hereinafter, referred to as "pre-photometry") are obtained and a difference between these two outputs is calculated.

A change of brightness of the subject caused by the pre-emission is calculated based on the difference between the outputs of the photometric sensor 108 at the time of the pre-photometry and the before-pre-emission photometry. Moreover, since the original brightness of the subject was obtained from the result of the constant light photometry in step S301, a main emission amount, which is an appropriate amount of emission at the time of shooting, is calculated based on the change of brightness and the original brightness.

Specifically, in step S305, the CPU 101 performs the before-pre-emission photometry with no flash emission by using the photometric sensor 108, and in step S307, controls the SPU 301 of the flash unit 300 to perform the pre-emission with the color temperature CCT1 and also perform the pre-photometry by using the photometric sensor 108.

In step S309, the CPU 101 calculates the main emission amount based on photometric results obtained by the constant light photometry in step S301, the before-pre-emission photometry in step S305, and the pre-photometry in step S307. The CPU 101 then controls the SPU 301 of the flash unit 300 to perform the main emission and shooting with the color temperature CCT1.

In step S310, the CPU 101 performs the white balance adjustment with the color temperature CCT1 by using the ICPU 112 on an image shot in the S309, and terminates the present process. As a result, the image with natural color is obtained.

Next, a description will be given of a case where it is determined as "YES" in steps S304, S306, and S308, that is, a case where a face of a person is detected through a face detection process. The image obtained by the photometric sensor 108 in the constant light photometry in step S301, the image obtained by the photometric sensor 108 in the before-pre-emission photometry in step S305, and the image obtained by the photometric sensor 108 in the pre-photometry in step S307 are conceivable as a target to be subjected to the face detection process.

Specifically, the CPU 101 causes the ICPU 112 to carry out the face detection process every time these images are obtained. When a face is detected in step S304, the process proceeds to step S304a, in which the CPU 101 performs the before-pre-emission photometry by using the photometric sensor 108 with no flash emission, and then the process proceeds to step S311. When a face is detected in steps S306 and S308, the process proceeds to step S311. Processes in step S311 and subsequent steps are performed for shooting the face beautifully by the flash shooting.

It should be noted that the reasons why the face detection process is performed not only in step S304 but also in steps S306 and S308 are because consideration is given to a case where a composition is changed by panning, and a face which could not be detected without flash emission may be detected in step S308 by performing the pre-emission in step S307.

Before explaining a process in step S311, a description will be given of a method for beautifully shooting a face in the flash shooting. Since a skin of a person tinged with red looks healthier and more beautiful, the color temperature of the flash light is set slightly lower than that used for the ambient light, and the white balance adjustment after shooting is performed with the color temperature of the ambient light.

Consequently, an image of the background to which the flash light does not reach is subjected to the white balance adjustment with the color temperature of the ambient light and exhibits natural color, and an image of a person within a range of the flash light is obtained with being tinged with red.

Subsequently, a description will be given of processes from steps S311 to S313. In step S311 at first, the CPU 101 decides an amount of offset A for setting the flash color temperature of the flash light to lower than the color temperature CCT1 of a subject environment light.

As described earlier, the flash color temperature of the flash light at the time of the face detection process may be set slightly lower than the color temperature of the subject environment light. Therefore, the amount of offset A may be set at −500 to perform flashing with the flash color temperature CCT1+A [K]. Although the amount of offset A is simply assumed at −500 here, the value for the amount of offset A may be arbitrary set by the user or may be changed depending on the color temperature CCT1 detected in step S302.

As an exceptional process performed at the time of the automatic white balancing, in a case where the color temperature CCT1 is lower than a predetermined value, there may be a case where a process to intentionally remain reddish tone in an entire image after being subjected to the white balancing is performed so as to place a significance on atmosphere. This aims to remain the reddish tone in the entire image without impairing the atmosphere in an evening scene picture. In a case where the flashing is performed with the amount of offset A=−500 in this case as well, the reddish tone remains in the entire image and a person who is irradiated with flash light is appeared more reddishly.

To solve this problem, in a case where the significance is placed on the atmosphere, a process to decrease the amount of offset A is carried out. In a case where a significance is simply placed on the atmosphere is performed, the amount of offset A may be zero, or may be A=−500+B by shifting the color temperature with which the white balancing adjustment is performed with placing the significance on the atmosphere by B [K] from the color temperature CCT1. Then, upon determining the amount of offset A of the flash color temperature, the CPU 101 proceeds the process to step S312.

In step S312, the CPU 101 performs the pre-emission with the flash color temperature CCT1+A [K] decided in step S311. Normally, in a flash shooting system of the present embodiment in which a main emission amount is decided based on a result of photometry in the pre-emission, the pre-emission and the main emission are affected by a color of a subject and the like unless they have the same color temperatures (spectral characteristics), and hence an accurate light control cannot be performed.

Therefore, the CPU 101 performs the pre-emission again with the color temperature CCT1+A [K], with which the main emission is performed, for example, in a case where the process proceeds from step S307 in which the pre-emission is performed with the color temperature CCT1 [K] to step S311 as well. The CPU 101 then performs the pre-emission with the color temperature CCT+A [K] and proceeds the process to step S313. However, losses of time and electricity are inevitable due to repetition of the pre-emission. Accordingly, the process in step S312 may be omitted in a case where the result of the pre-emission with the color temperature CCT1 was already obtained in step S307 at the expense of an accuracy of light control to a certain degree.

In step S313, the CPU 101 controls the SPU 301 of the flash unit 300 to perform the main emission and shooting operation and proceeds the process to step S310.

In a case where the process proceeds to step S311 via step S304, the CPU 101 calculates the main emission amount based on the results of the constant light photometry in step S301, the before-pre-emission photometry in step S304a, and the pre-photometry in step S312. In a case where the process proceeds to step S311 via step S306, the CPU 101 calculates the main emission amount based on the results of the constant light photometry in step S301, the before-pre-emission photometry in step S305, and the pre-photometry in step S312. Further, in a case where the process proceeds to step S311 via step S308, the CPU 101 calculates the main emission amount based on the results of the constant light photometry in step S301, the before-pre-emission photometry in step S305, and the pre-photometry in step S307 or step S312.

In step S310, the CPU 101 causes the ICPU 122 to perform the white balance adjustment with the color temperature CCT1 on the image shot in step S313 and terminates the present process. As a result, the image with natural color is obtained. It should be noted that the color temperature for the white balance adjustment is not limited to this if the above described process placing a significance on the atmosphere is performed, and the white balance adjustment may be performed with another color temperature such as the color temperature CCT1+B [K].

Subsequently, a description will be given of the processes in step S314 to S318 performed in the case where it is determined that the color temperature CCT1 detected in step 302 does not fall within the range between 3000 and 7000 [K] in step S303.

In step S314, the CPU 101 causes the photometric sensor 108 to perform the before-pre-emission photometry with no flash emission in the same manner as step S305 and proceeds the process to step S315.

In step S315, the CPU 101 carries out a process to decide a color temperature CCT2 for the flashing and the white balance adjustment, and proceeds the process to step S316. As described earlier, in a case where the color temperature detected in step S302 is extremely low or extremely high, misdetection of the color temperature of the ambient light is suspected. Therefore, when the color temperature CCT1 detected in step S302 is lower than the range of determination in step S303, for example, 2000 [K], the CPU 101 carries out a process to set the color temperature CCT2 to 3000 [K] and clip it as a lower limit value of the range of determination in step S303. In contrast, when the color temperature CCT1 detected in step S302 is higher than the range of determination in step S303, for example, 8000 [K], the CPU 101 carries out the process to set the color temperature CCT2 to 7000 [K] and clip it as an upper limit value of the range of determination in step S303.

In this embodiment, although the color temperature CCT2 is clipped at the upper limit/lower limit value of a threshold of the determination in step S303 and decided, the color temperature CCT2 may be set at 5000 [K] which is a color temperature of an ordinal ambient light in daily life.

In step S306, the CPU 101 controls the SPU 301 of the flash unit 300 to perform the pre-emission with the color temperature CCT2 decided in step S315 and perform the pre-photometry by the photometric sensor 108, and proceeds the process to step S317.

In step S317, the CPU 101 controls the SPU 301 of the flash unit 300 to perform the main emission and the shooting operation with the color temperature CCT2 decided in step S315, and proceeds the process to step S318. The CPU 101 calculates the main emission amount based on photometric results of the constant light photometry in step S301, the before-pre-emission photometry in step S314, and the pre-photometry in step S316.

In step S318, the CPU 101 performs the white balance adjustment on the image shot in step S317 with the color temperature CCT2 decided by the ICPU 112 in step S315, and terminates the present process. As a result, the image with natural color is obtained.

As described above, in the embodiment, it is possible to provide a flash emission control technique of the camera which enables the flash shooting in which a subject such as a person is easily and beautifully picked up and a background with a natural hue is also picked up.

It should be noted that in the above described embodiment, although the process is performed under the following conditions: the flash light: the color temperature CCT1+A [K] and the white balance adjustment: the color temperature CCT1 [k], the present invention is not limited to this. For example, a color temperature CCT3 for flash light (fixed value) and a color temperature CCT 4 for white balancing (fixed value) which are ideal for shooting a face may be stored in advance in the memory 102 and the memory 113, more simply. Namely, the processes in steps S311 to S313 and S310 may be performed under the following conditions: the flash light: the color temperature CCT3 [K] and the white balance adjustment: the color temperature CCT4 [K].

Performing the before-pre-emission photometry in steps S305, S304a and S314 before the pre-emission improves an accuracy of calculating the amount of main emission, however, the amount of main emission may be calculated by alternatively using the result of photometry in step S301 without performing the before-pre-emission photometry.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-149199, filed Aug. 1, 2017, which is hereby incorporated by reference herein in its entirety.

What is claimed is:

1. An image pickup apparatus which is capable of performing shooting using a light emitting device that is able to vary a color temperature of an illumination light, the image pickup apparatus comprising:

at least one processor, the at least one processor functioning in accordance with a program stored in a memory as:

an obtainment unit configured to obtain a color temperature of an ambient light;

a detection unit configured to detect a main subject;

an adjustment unit configured to perform a white balance adjustment on a shot image; and a control unit configured to, in a case where the detection unit detects the main subject at a time of shooting perform the shooting with causing the light emitting device to emit a light with a color temperature which is set lower by a predetermined amount determined in advance from the obtained color temperature depending on the color temperature obtained by the obtainment unit, and cause the adjustment unit to perform the white balance adjustment on the shot image with the obtained color temperature, wherein in a case where the obtained color temperature does not fall within a predetermined range determined in advance, the control unit performs the shooting with causing the light emitting device to emit the light with a color temperature within the predetermined range and causes the adjustment unit to perform the white balance adjustment on the shot image.

2. The image pickup apparatus according to claim 1, the at least one processor further functions as:
a decision unit configured to decide a main emission amount at the time of shooting based on a result of photometry of preliminary emission by the light emitting device,
wherein in a case where the detection unit detects the main subject from a result of the photometry of the preliminary emission, the control unit causes the light emitting device to perform the preliminary emission again and the main emission for the shooting with the color temperature which is set lower by the predetermined amount.

3. The image pickup apparatus according to claim 1, the at least one processor further functions as:
a decision unit configured to decide a main emission amount at the time of shooting based on a result of photometry of preliminary emission by the light emitting device,
wherein in a case where the detection unit detects the main subject from a result of the photometry of the preliminary emission, the control unit performs the shooting with causing the light emitting device to perform main emission with the color temperature which is set lower by the predetermined amount.

4. The image pickup apparatus according to claim 1, the at least one processor further functions as:
a color temperature detection unit configured to detect the color temperature of the ambient light,
wherein the obtainment unit obtains the color temperature detected by the color temperature detection unit.

5. The image pickup apparatus according to claim 1, wherein the detection unit detects a face of a person as the main subject.

6. The image pickup apparatus according to claim 1, wherein the light emitting device is detachably attachable to the image pickup apparatus.

7. A light emission control apparatus which controls flash emission by a light emitting device that is able to vary a color temperature of an illumination light, the light emission control apparatus comprising:
at least one processor, the at least one processor functioning in accordance with a program stored in a memory as:
an obtainment unit configured to obtain a first color temperature which is a color temperature of an ambient light; and
a light emission control unit configured to cause the light emitting device to emit a light with a second color temperature which is different from and set based on the first color temperature obtained by the obtainment unit, and
a processing unit configured to, based on the first color temperature, perform a white balancing process on an image shot when the light emission control unit causes the light emitting device to emit the light with the second color temperature,
wherein in a case where the first color temperature falls within a predetermined range, the light emission control unit causes the light emitting device to emit the light with the second color temperature,
wherein in a case where the first color temperature does not fall within the predetermined range, the light emission control unit causes the light emitting device to emit a light with a third color temperature which is a predetermined color temperature included in the predetermined range, and
wherein based on the third color temperature, the processing unit performs the white balancing process on an image shot when the light emission control unit causes the light emitting device to emit the light with the third color temperature.

8. The light emission control apparatus according to claim 7, wherein the light emission control unit sets a color temperature which is offset by a predetermined amount from the first color temperature to the second color temperature.

9. The light emission control apparatus according to claim 7, wherein the light emission control unit sets a color temperature which is offset from the first color temperature to the second color temperature and changes an amount of offset for offsetting the first color temperature according to the first color temperature.

10. The light emission control apparatus according to claim 9, wherein the second color temperature varies according to the first color temperature.

11. The light emission control apparatus according to claim 7, the at least one processor further functions as:
a detection unit configured to detect a person,
wherein in a case where the detection unit detects a person, the light emission control unit causes the light emitting device to emit the light with the second color temperature.

12. The light emission control apparatus according to claim 11, the at least one processor further functions as:
a processing unit configured to, based on the first color temperature, perform a white balancing process on an image shot when the light emission control unit causes the light emitting device to emit the light with the second color temperature,
wherein in a case where the detection unit does not detect a person, the light emission control unit causes the light emitting device to emit the light with the first color temperature, and
wherein based on the first color temperature, the processing unit performs the white balancing process on an image shot when the light emitting control unit causes the light emitting device to emit the light with the first color temperature.

13. A control method for an image pickup apparatus which is capable of performing shooting using a light emitting device that is able to vary a color temperature, the control method comprising:
an obtainment step of obtaining a color temperature of an ambient light;
a detection step of detecting a main subject;
an adjustment step of performing a white balance adjustment on a shot image; and
a control step of:
in a case where the main subject at a time of shooting is detected in the detection step, selecting a predetermined offset amount based on an obtained color temperature of the ambient light, performing the shooting with causing the light emitting device to emit a light with a color temperature which is set lower by a predetermined amount determined in advance from the obtained color temperature depending on the color temperature obtained in the obtainment step, and performing the white balance adjustment on the shot image with the obtained color temperature, and in a case where the obtained color temperature does not fall within a predetermined range determined in advance, performing the shooting with causing the light emitting device to emit the light with a color temperature within the predetermined range and performing the white balance adjustment on the shot image.

* * * * *